United States Patent
Daiss et al.

(10) Patent No.: US 9,925,511 B2
(45) Date of Patent: Mar. 27, 2018

(54) APPARATUS FOR INTRODUCTION OF DROPLETS OF A MONOMER SOLUTION INTO A REACTOR

(71) Applicant: BASF SE, Ludwigschafen (DE)

(72) Inventors: Andreas Daiss, Ludwigshafen (DE); Robert Bayer, Sinsheim (DE); Rudolf Schliwa, Alzenau (DE); Jürgen Freiberg, Lampertheim (DE); Karl J. Possemiers, Speyer (DE); Marco Krüger, Mannheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/320,771

(22) PCT Filed: Jun. 23, 2015

(86) PCT No.: PCT/EP2015/064026
§ 371 (c)(1),
(2) Date: Dec. 21, 2016

(87) PCT Pub. No.: WO2015/197571
PCT Pub. Date: Dec. 30, 2015

(65) Prior Publication Data
US 2017/0232418 A1    Aug. 17, 2017

(30) Foreign Application Priority Data

Jun. 23, 2014  (EP) ..................................... 14173483

(51) Int. Cl.
*B01J 19/06*    (2006.01)
*B01J 4/00*    (2006.01)
(Continued)

(52) U.S. Cl.
CPC ............... *B01J 19/06* (2013.01); *B01J 4/004* (2013.01); *B01J 19/24* (2013.01); *C08F 20/18* (2013.01); *B01J 2219/24* (2013.01)

(58) Field of Classification Search
CPC ... B01J 19/06; B01J 19/24; B01J 13/14; B01J 13/18; B01J 4/004; B01D 3/008
See application file for complete search history.

(56) References Cited

U.S. PATENT DOCUMENTS 7,994,266 B2    8/2011    Ducker et al.
2011/0059329 A1    3/2011    Dobrawa et al.

FOREIGN PATENT DOCUMENTS

DE    10 2005 044 035 A1    3/2007

OTHER PUBLICATIONS

International Search Report (translation), International Application No. PCT/EP2015/064026, dated Aug. 17, 2015.

*Primary Examiner* — Lessanework Seifu
(74) *Attorney, Agent, or Firm* — Marshall, Gerstein & Borun LLP

(57) ABSTRACT

An apparatus for introducing droplets of a monomer solution for production of poly(meth)acrylate into a reactor for droplet polymerization, comprising at least one channel or a dropletizer head, the channel or the dropletizer head being sealed at its base by a dropletizer plate, the dropletizer plate having holes through which the monomer solution is introduced into the reactor, and the dropletizer plate being configured such that holes that, in an axially symmetric dropletizer plate or in an annular dropletizer plate or in one configured as a ring segment, are not on a center line of the dropletizer plate or, in the case of a circular dropletizer plate, are not at the center of the dropletizer plate are aligned such that monomer solution is introduced through the holes into the reactor at an angle to the vertical, and the holes in the case of a radial alignment of axially symmetric dropletizer (Continued)

Figure 1:
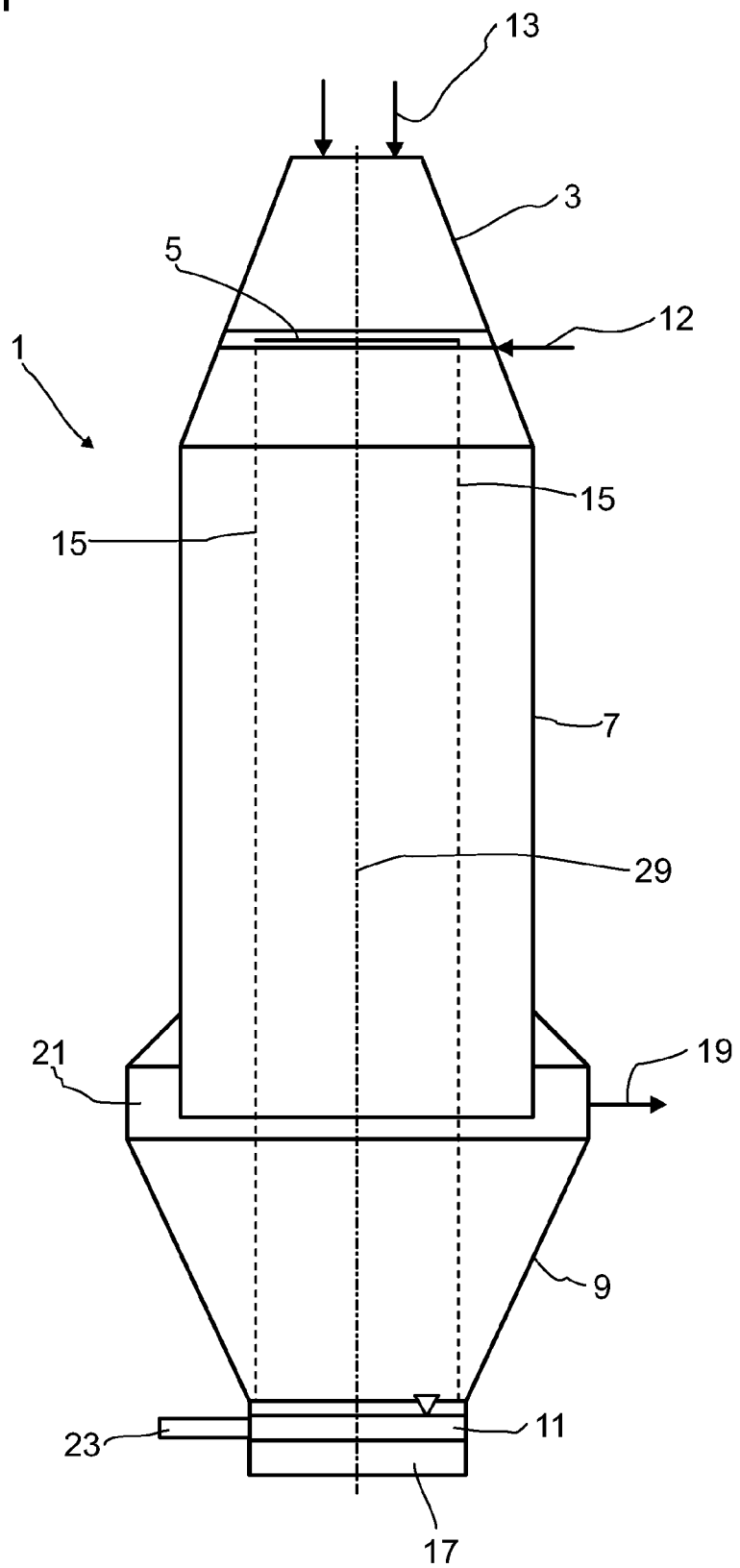

plates being aligned such that the angle at which the monomer solution is introduced into the reactor decreases in the direction of the axis of the reactor and, in the case of dropletizer plates arranged parallel to one another or of concentrically arranged dropletizer plates, each being aligned on a line parallel to the center line or line running concentrically about the center, such that the angle at which the monomer solution is introduced into the reactor is constant.

12 Claims, 5 Drawing Sheets

(51) Int. Cl.
    *B01J 19/24*     (2006.01)
    *C08F 20/18*     (2006.01)

APPARATUS FOR INTRODUCTION OF DROPLETS OF A MONOMER SOLUTION INTO A REACTOR

CROSS-REFERENCE TO RELATED APPLICATIONS

This is the U.S. national phase of International Patent Application No. PCT/EP2015/064026, filed Jun. 23, 2015, which claims the benefit of European Patent Application No. 14173483.0, filed Jun. 23, 2014.

The invention proceeds from an apparatus for introduction of droplets of a monomer solution for production of poly(meth)acrylate into a reactor for droplet polymerization, comprising at least one channel or a dropletizer head, the channel or the dropletizer head being sealed at its base by a dropletizer plate, the dropletizer plate having holes through which the monomer solution is introduced into the reactor.

Poly(meth)acrylates find use especially as water-absorbing polymers which are used, for example, in the production of diapers, tampons, sanitary napkins and other hygiene articles, or else as water-retaining agents in market gardening.

The properties of the water-absorbing polymers can be adjusted via the level of crosslinking. With increasing level of crosslinking, there is a rise in gel strength and a fall in absorption capacity. This means that centrifuge retention capacity decreases with rising absorption under pressure, and the absorption under pressure also decreases again at very high levels of crosslinking.

To improve the performance properties, for example liquid conductivity in the diaper and absorption under pressure, water-absorbing polymer particles are generally postcrosslinked. This only increases the level of crosslinking at the particle surface, and in this way it is possible to at least partly decouple absorption under pressure and centrifuge retention capacity. This postcrosslinking can be performed in aqueous gel phase. In general, however, ground and sieved polymer particles are surface coated with a postcrosslinker, thermally postcrosslinked and dried. Crosslinkers suitable for this purpose are compounds which comprise at least two groups which can form covalent bonds with the carboxylate groups of the hydrophilic polymer.

Different processes are known for production of the water-absorbing polymer particles. For example, the monomers and any additives used for production of poly(meth)acrylates can be added to a mixing kneader, in which the monomers react to give the polymer. Rotating shafts with kneading bars in the mixing kneader break up the polymer formed into chunks. The polymer withdrawn from the kneader is dried and ground and sent to further processing. In an alternative variant, the monomer is introduced in the form of a monomer solution which may also comprise further additives into a reactor for droplet polymerization. On introduction of the monomer solution into the reactor, it disintegrates into droplets. The mechanism of droplet formation may be turbulent or laminar jet disintegration, or else dropletization. The mechanism of droplet formation depends on the entry conditions and the physical properties of the monomer solution. The droplets fall downward in the reactor, in the course of which the monomer reacts to give the polymer. In the lower region of the reactor is a fluidized bed into which the polymer particles formed from the droplets by the reaction fall. Further reaction then takes place in the fluidized bed. Corresponding processes are described, for example, in WO-A 2006/079631, WO-A 2008/086976, WO-A 2007/031441, WO-A 2008/040715, WO-A 2010/003855 and WO-A 2011/026876.

A disadvantage of all the processes that are conducted by the principle of spray drying, in which monomer solution disintegrates into droplets and falls downward in a reactor to form the polymer, is that droplets can coalesce on collision, and droplets hitting the wall of the reactor can also stick and thus lead to unwanted formation of deposits.

It is therefore an object of the present invention to provide an apparatus for introduction of droplets of a monomer solution for production of poly(meth)acrylate into a reactor for droplet polymerization, in which coalescence of the individual droplets is substantially avoided and, in addition, the droplets are distributed with maximum homogeneity over the reactor cross section.

The object is achieved by an apparatus for introducing droplets of a monomer solution for preparation of poly(meth)acrylate into a reactor for droplet polymerization, comprising at least one channel or a dropletizer head, the channel or the dropletizer head being sealed at its base by a dropletizer plate, the dropletizer plate having holes through which the monomer solution is introduced into the reactor, and the dropletizer plate being configured such that holes that, in an axially symmetric dropletizer plate or in an annular dropletizer plate or in one configured as a ring segment, are not on a center line of the dropletizer plate or, in the case of a circular dropletizer plate, are not at the center of the dropletizer plate are aligned such that monomer solution is introduced through the holes into the reactor at an angle to the vertical, and the holes in the case of a radial alignment of axially symmetric dropletizer plates being aligned such that the angle at which the monomer solution is introduced into the reactor decreases in the direction of the axis of the reactor and, in the case of dropletizer plates arranged parallel to one another or of concentrically arranged dropletizer plates, each being aligned on a line parallel to the center line or line running concentrically about the center, such that the angle at which the monomer solution is introduced into the reactor is constant.

The inventive arrangement of the holes in the dropletizer plates affords a sufficiently great distance between the individual droplets in the reactor, such that they do not coalesce and, in addition, all the droplets are surrounded by sufficient gas to enable the reaction of the monomer solution to give the poly(meth)acrylate. In addition, the entire cross section of the reactor can be exploited. A further advantage of the inventive apparatus for introduction of droplets is that the cross-sectional area which is covered by the apparatus is very small, such that sufficient gas can flow around the apparatus. In addition, the individual portions of the apparatus can be configured with the minimum possible width, in order to minimize the influence of the apparatus for introduction of the monomer solution on the flow of the gas.

In a first embodiment of the invention, the monomer solution is introduced into the reactor with a dropletizer head, the dropletizer head being sealed at its base by a rotationally symmetric dropletizer plate through which the monomer solution is introduced. The dropletizer plate that concludes the dropletizer head preferably has holes for addition of the monomer solution arranged in a ring around the center of the dropletizer plate. The effect of the alignment of the holes such that the monomer solution added through the outer holes exits from the holes at an angle is that the droplets have a velocity component that points away from the center in a radial direction. This allows the cross section of the dropletizer head to be configured so as to be much smaller than the diameter of the reactor. In addition, it is also possible to provide a plurality of dropletizer heads each having a comparable configuration.

In a second embodiment, the apparatus for introduction of the monomer solution has at least one annular channel. In this case, the channel is configured, at its base, with an annular dropletizer plate or alternatively with a plurality of dropletizer plates each configured in the form of a ring section. In this case, the holes in the dropletizer plates are arranged such that the holes in the middle, preferably on the annular center line of the dropletizer plate, are aligned such that the monomer solution exits from the holes downward, parallel to the axis of the reactor. At the edge of the dropletizer plate, the holes are aligned such that the liquid exits at an angle to the axis of the reactor. This arrangement of the holes allows the distribution of the droplets over the entire cross section of the reactor. In the case of a high reactor diameter, it is possible to provide a plurality of annular channels arranged concentrically about a common center. The angle at which the liquid exits and the distance between the annular channels are preferably chosen such that the droplets exiting from channels arranged alongside one another do not come into contact and the trajectories do not intersect.

In a third embodiment, the apparatus for introduction of the monomer solution comprises a plurality of channels that run parallel to one another. In this case, the dropletizer plates are preferably rectangular, and the holes along the center line that extends parallel to the long edges of the rectangle are preferably aligned such that the monomer solution drips vertically downward, parallel to the axis of the reactor, and the holes that are on the center line are aligned such that the liquid exits at an angle to the axis of the reactor. It is possible here to keep the angle the same or to execute the holes such that the angle increases toward the edges of the dropletizer plate.

In a fourth, preferred embodiment, the apparatus for introduction of the monomer solution comprises a plurality of channels that are each aligned radially. This gives rise to a star-shaped arrangement of the channels, where the channels may be of different length. In the case of a radial arrangement of the channels in which the channels are of different length, it is preferable when the channels project to different extents from the outside in the direction of the middle of the reactor. The arrangement is preferably such that one or more shorter channels are positioned between two channels that project to the middle, the length of the channels decreasing from one channel that projects to the middle of the reactor as far as the center line between the two channels that project to the middle of the reactor, and increasing again from the center line between the two channels that project to the middle of the reactor to the second channel that projects to the middle of the reactor. In the case of the radial arrangement of the channels, holes which extend along the center line of the dropletizer plates are aligned such that the monomer solution drips vertically downward through these holes, and monomer solution exits at an angle relative to the axis of the reactor from holes that are not on the center line, and it is possible here too to keep the angle of all the holes that are not on the center line the same or to execute the holes such that the angle increases towards the edges of the dropletizer plate. According to the invention, in the case of a radial arrangement of the channels, the angle at which the monomer solution is added decreases toward the axis of the reactor. In this way, the monomer solution is introduced at a greater angle through the holes further removed from the axis, such that the droplets that form fly further away from the channel, such that a homogeneous droplet distribution is obtained over the cross section of the reactor.

Typically, the monomer solution exits from the holes of the apparatus for dropletization in the form of a liquid jet which then disintegrates into droplets in the reactor. The disintegration of the liquid jet depends firstly on the amount of the liquid which exits through the holes per unit time, and secondly on the velocity and volume of the gas flowing through the reactor. In addition, the physical properties of the monomer solution and the geometry of the holes affect the way in which the jet disintegrates. In the context of present invention, droplet disintegration is also referred to as dropletization.

In order that enough gas can flow past the apparatus for dropletization of the monomer solution, so that a homogeneous gas velocity in the reactor can be achieved and there is not excessive acceleration and vortexing of the gas as it flows round the apparatus, it is additionally preferable that the ratio of the area covered by the apparatus for dropletization in the reactor relative to the area which is enclosed by the line connecting the outermost holes is less than 50% and preferably in the range between 3% and 30%.

In order that the droplets exiting from the channels come into contact as quickly as possible with the gas flowing around the channels, it is additionally preferable when the channels have a minimum width. The width of the channels is preferably in the range from 25 to 500 mm, further preferably in the range from 100 to 400 mm and especially in the range from 150 to 350 mm.

It is additionally preferable when the number of holes relative to the area which is formed by the line connecting the outermost holes is in the range from 100 to 1000 holes/m$^2$, preferably in the range from 150 to 800 holes/m$^2$ and especially in the range from 200 to 500 holes/m$^2$. This ensures that the droplets formed at the holes have a sufficiently large separation and can additionally come into sufficient contact with the gas flowing through the reactor.

When the apparatus for introduction of the monomer solution comprises channels that run parallel, it is preferable when at least two distributor arrangements each having at least two dropletizer plates arranged parallel to one another are arranged at an angle relative to one another, so as to give rise to a multiangular pitch. Distributor arrangement is understood to mean the channels aligned parallel to one another in each case. When the channels of the distributor arrangements are arranged at an angle of 90° relative to one another, the result is a rectangular pitch, and in the case of an angle of 60° a triangular pitch. As well as an angle between the channels of the individual distributor arrangements of 90° or 60°, any other angle, for example 45°, is also possible. However, the effect of other angles is generally that different polygons are formed by the crossing channels. Preference is given to an arrangement of the channels such that crossing channels give rise to a triangular pitch or rectangular pitch, the distance between the channels running parallel being very substantially the same, such that equilateral triangles are formed by the crossing channels of the distributor arrangements in the case of triangular pitch, and squares in the case of rectangular pitch.

In the embodiment with radial arrangement of the dropletizer plates, the decreasing angle at which the monomer solution is introduced into the reactor is obtained, for example, by virtue of a channel being sealed by at least two dropletizer plates and the angle at which the monomer solution is dropletized into the reactor being constant for each row of holes in a dropletizer plate, the angles being less in the dropletizer plates disposed closer to the middle of the reactor than the angles of the dropletizer plates disposed further to the outside.

The number $N_{RL}$ of individual channels in the case of a star-shaped arrangement is dependent on the circumference C of the reactor at the position where the channels are arranged. Preferably, the number of channels is within the range defined below:

$$\frac{C}{4.0 \text{ m}} \leq N_{RL} \leq \frac{C}{1.2 \text{ m}}$$

and especially $$\frac{C}{3.6 \text{ m}} \leq N_{RL} \leq \frac{C}{1.8 \text{ m}}.$$

In these formulae, the circumference C should be used in meters and "m" means meters.

When the channels are arranged so as to give rise to a multiangular pitch, it is advantageous to introduce the channels that run parallel to one another with different distributor arrangements into the reactor at different levels, such that they cross but do not intersect at the same height.

The angle at which the monomer solution is introduced into the reactor is preferably in the range from 0° to 30°, more preferably in the range from 0.1° to 20° and especially in the range from 0.2° to 15°. The angle depends on the velocity at which the monomer solution is introduced into the reactor and the magnitude of the distance between two channels, in order that the trajectories of the droplets leaving two adjacent channels do not intersect.

As well as the embodiment in which a dropletizer plate has constant angles and the angles of the individual dropletizer plates of the channel are different, it is also possible and preferable when, in the case of radial arrangement of the dropletizer plates, the angle at which the monomer solution is introduced into the reactor increases from the center of the reactor outward in a dropletizer plate. This configuration of the dropletizer plates affords further homogenization of the droplet distribution over the cross section of the reactor.

In a preferred embodiment, in the case of radial arrangement of the channels, the angle α at which the monomer solution exits at least from the holes at the radial edges is within the range defined below:

$$\frac{r}{N_{LR} \cdot d_P \cdot v^{0.578}} \cdot (0.00697 \cdot r + 0.0332) - 6.296 \leq$$

$$\alpha \leq \frac{r}{N_{LR} \cdot d_P \cdot v^{0.578}} \cdot (0.00697 \cdot r + 0.0332) + 4.704,$$

preferably $$\frac{r}{N_{LR} \cdot d_P \cdot v^{0.578}} \cdot (0.00697 \cdot r + 0.0332) - 4.296 \leq$$

$$\alpha \leq \frac{r}{N_{LR} \cdot d_P \cdot v^{0.578}} \cdot (0.00697 \cdot r + 0.0332) + 2.704$$

and more preferably $$\frac{r}{N_{LR} \cdot d_P \cdot v^{0.578}} \cdot (0.00697 \cdot r + 0.0332) - 2.296 \leq$$

$$\alpha \leq \frac{r}{N_{LR} \cdot d_P \cdot v^{0.578}} \cdot (0.00697 \cdot r + 0.0332) + 1.704,$$

for the range of validity $$0.25 \text{ m} \leq r \leq 10 \text{ m}$$

$$0.0001 \text{ m} \leq d_P \leq 0.0015 \text{ m}$$

$$3\frac{\text{m}}{\text{s}} \leq v \leq 30\frac{\text{m}}{\text{s}}$$

$$3 \leq N_{LR} \leq 18.$$

In these formulae, r is the radial position of the hole in meters, $N_{LR}$ is the number of channels, $d_p$ is the mean droplet diameter in meters and v is the droplet exit velocity in meters per second. The angle α of the holes is found in degrees. If a value less than zero is found, the value of 0° should be used for the angle in place of the value calculated.

The exit angle of the droplets relative to the axis of the reactor can be optimized further by numerical simulation calculations. As well as a constant change in the exit angle, it is alternatively also possible to change the exit angle of the droplets stepwise. For this purpose, in that case, the angle in the middle of each stage is preferably fixed according to the above definition. A stepwise arrangement also results, for example, through the above-described variant with a plurality of dropletizer plates, in which the angles of a dropletizer plate are constant, but the angles of dropletizer plates closer to the axis of the reactor are different from those of dropletizer plates further removed from the axis.

If holes along the center line running parallel to the axis of the channel are provided in an axially symmetric dropletizer plate or in a dropletizer plate configured as a ring or ring section, or at the center in a circular dropletizer plate, these are preferably aligned such that the monomer solution which is introduced through the holes drips vertically downward.

In order to align the holes such that the monomer solution is introduced into the reactor at an angle to the vertical, it is possible to introduce each of the holes into the dropletizer plate at the desired angle. It is preferable, however, to introduce all the holes at right angles to the dropletizer plate and to form the dropletizer plates such that they have a profile angled along the center line thereof, a profile multiply angled symmetrically to the center line, or a profile in the form of a circle segment. By virtue of the profile of the dropletizer plate being angled or configured in the form of a circle segment, the holes introduced into the dropletizer plate run at an angle to the vertical of the reactor, such that the monomer solution is introduced into the reactor at the angle possessed by the holes.

If the profile along the center line is angled, the result is two inclined regions preferably aligned symmetrically to the vertical in the reactor, such that the monomer solution flows symmetrically out of the dropletizer plate to form droplets. In the case of a multiply angled profile too, the profile formed is preferably symmetric with respect to a vertical plane of symmetry running through the center line of the dropletizer plate. A multiply angled profile may have, for example, a horizontal middle region and two lateral inclined regions. It is also possible to provide a plurality of inclined regions on each side, in which case the angle of the inclined regions increases toward the edge of the dropletizer plate. Toward the edge of the dropletizer plate, this gives rise to holes having a greater angle than holes closer to the center line, such that the monomer solution leaving the outer holes flies further away from the channel. This also ensures further homogenization of the droplet distribution over the cross section of the reactor so far below the apparatus for introduction of the monomer solution that the droplets fall vertically downward.

In order that a sufficiently large number of droplets can be produced and, in addition, the droplets are distributed over the entire reactor cross section, a plurality of channels each having one or more dropletizer plates are encompassed in a radial, parallel or annular arrangement of the dropletizer plates. Especially in the case of high reactor diameters and correspondingly long channels, it is advisable for manufacturing reasons to seal each channel with a plurality of relatively small dropletizer plates. This especially also has the advantage that, in the case of any possible revision that may be necessary, individual dropletizer plates of a channel can be exchanged, which allows better handling. Especially in the case of an arrangement of the channels in multiangular pitch, individual dropletizer plates each corresponding to no more than the distance between two crossing points of the channels are used, in order to avoid dripping of monomer solution from higher channels onto lower channels. In the case of a radial arrangement with channels of different length, it is possible, depending on the length, to provide a different number of dropletizer plates and to make all the dropletizer plates the same.

For a simple revision, for example for cleaning of the dropletizer plates, it is advantageous to connect them in a detachable manner, for example by screw connection, to the channel or the dropletizer head. Another option, albeit less preferred, is a form-fitting connection of the dropletizer plate to the channel or the dropletizer head, for example through welding, soldering or adhesive bonding. In addition, it is also possible to configure the channel and dropletizer plates or dropletizer head and dropletizer plate in one piece, in which case the base of the channel or of the dropletizer head forms the dropletizer plate.

The distance from the outermost holes of a dropletizer plate to the edge of the dropletizer plate is preferably not more than 200 mm, more preferably not more than 100 mm and especially not more than 50 mm. In this way, the channels can be configured so as to be sufficiently narrow to hinder gas flow only slightly; in addition, the dropletizer plates are not so long that simple handling is no longer possible.

In order to produce a sufficiently large number of droplets, it is preferable when the holes in the dropletizer plates are arranged in several rows of holes. It is especially preferable here when the distance between the individual holes in a row of holes and the distance between adjacent rows of holes is essentially the same. A suitable distance between the holes in a row of holes and of the rows of holes from one another is in the range from 1 to 100 mm, preferably in the range from 2 to 50 mm and especially in the range from 3 to 20 mm. Even if the holes are not arranged in rows of holes, the distance between the holes is preferably within these ranges.

In order to obtain droplets of a suitable size for water-absorbing polymers, it is additionally preferable when the holes in the dropletizer plates have a diameter in the range from 25 to 500 µm.

Working examples of the invention are shown in the figures and are more particularly described in the description which follows.

Figure 2:
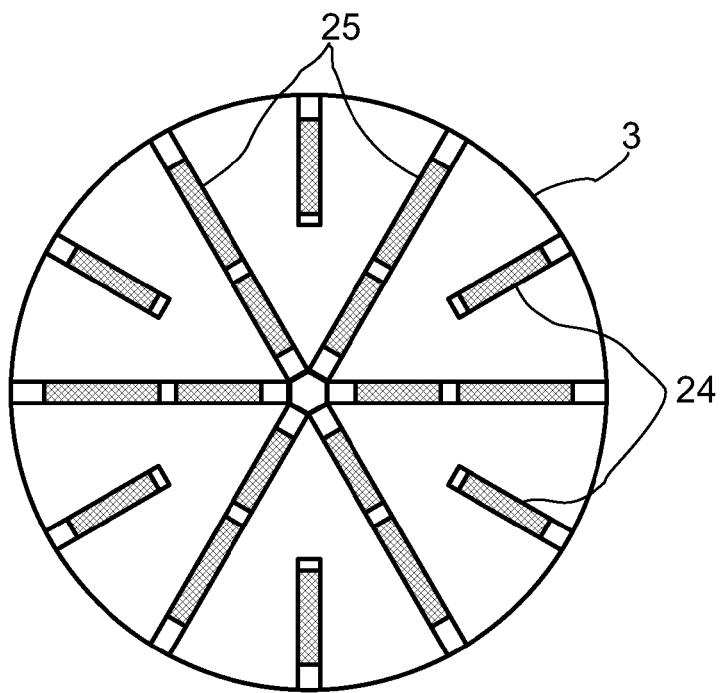
Figure 3:
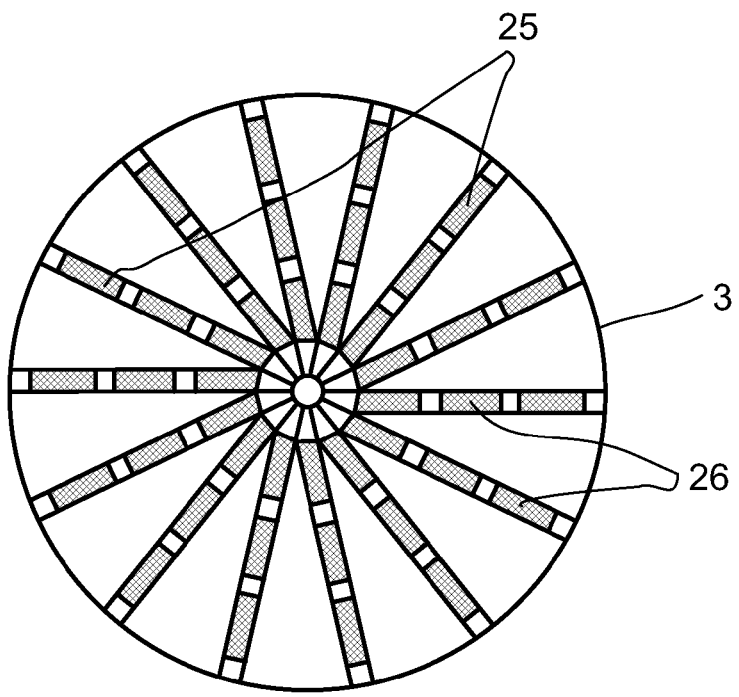
Figure 4:
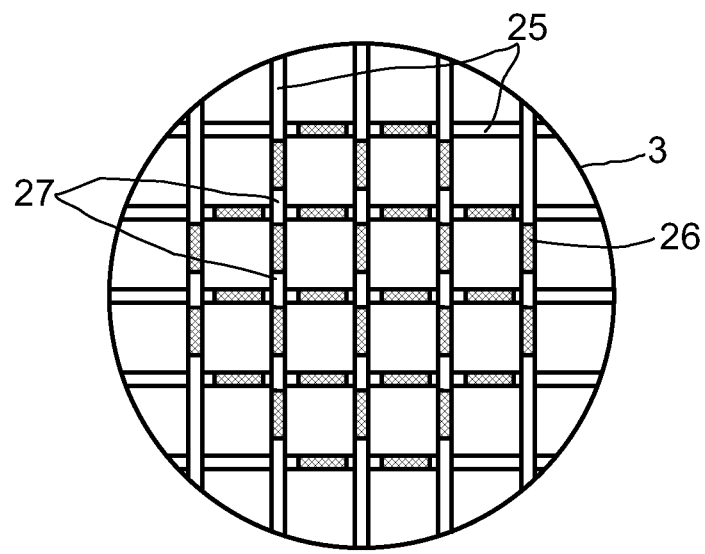
Figure 5:
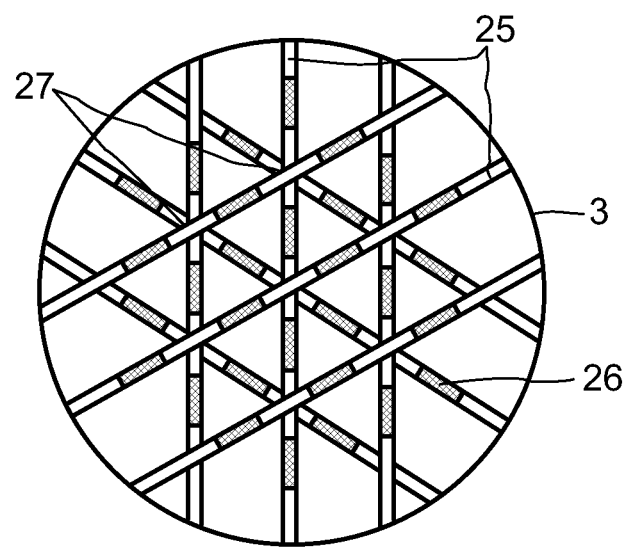
Figure 6:
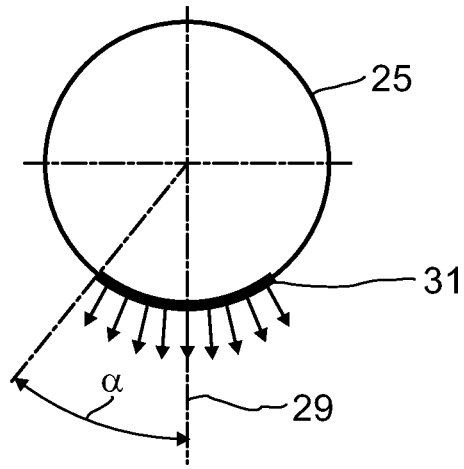
Figure 7:
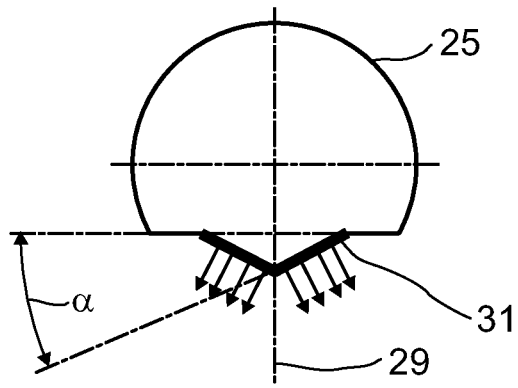
Figure 8:
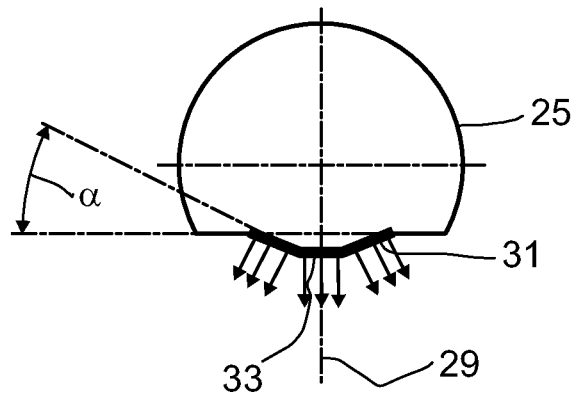
Figure 9:
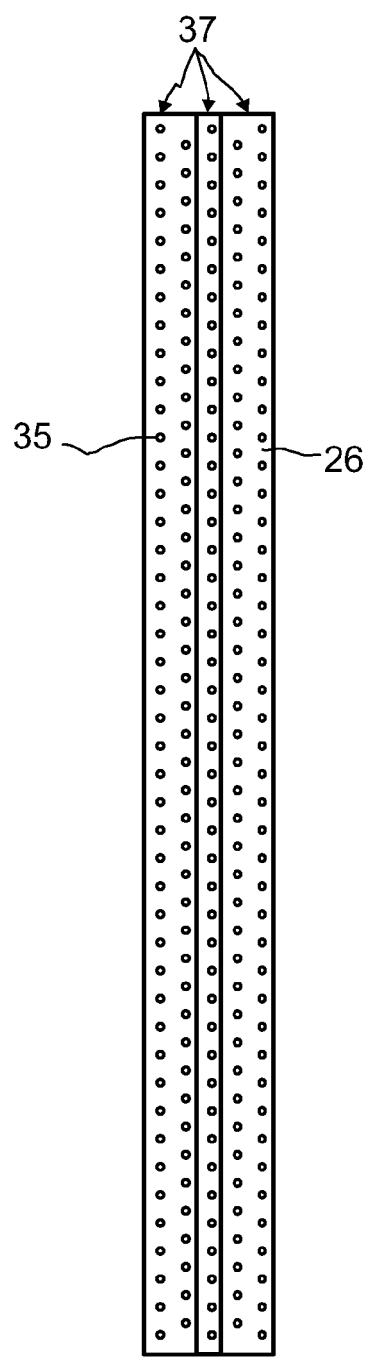

The figures show:

FIG. 1 a longitudinal section through a reactor for droplet polymerization,

FIG. 2 an arrangement of radial dropletizer channels of different length,

FIG. 3 an arrangement of dropletizer channels arranged in a star shape,

FIG. 4 an arrangement of dropletizer channels in rectangular pitch,

FIG. 5 an arrangement of dropletizer channels in triangular pitch,

FIG. 6 a cross section through a dropletizer channel in a first embodiment,

FIG. 7 a cross section through a dropletizer channel in a second embodiment,

FIG. 8 a cross section through a dropletizer channel in a third embodiment,

FIG. 9 a top view of a dropletizer plate.

FIG. 1 shows a longitudinal section through a reactor for droplet polymerization, as used with preference for production of poly(meth)acrylate particles.

A reactor 1 for droplet polymerization comprises a reactor head 3 in which there is accommodated an apparatus for dropletization 5, a middle region 7 in which the polymerization reaction proceeds, and a lower region 9 having a fluidized bed 11 in which the reaction is concluded.

For performance of the polymerization reaction to prepare the poly(meth)acrylate, the apparatus for dropletization 5 is supplied with a monomer solution via a monomer feed 12. When the apparatus for dropletization 5 has a plurality of channels, it is preferable to supply each channel with the monomer solution via a dedicated monomer feed 12. The monomer solution exits through the holes, which are not shown in FIG. 1, in the apparatus for dropletization 5 and disintegrates into individual droplets which fall downward within the reactor. Through a first addition site for a gas 13 above the apparatus for dropletization 5, a gas, for example nitrogen or air, is introduced into the reactor 1. This gas flow supports the disintegration of the monomer solution exiting from the holes of the apparatus for dropletization 5 into individual droplets. In addition, the gas flow promotes lack of contact of the individual droplets and coalescence thereof to larger droplets.

In order firstly to make the cylindrical middle region 7 of the reactor very short and additionally to avoid droplets hitting the wall of the reactor 1, the reactor head 3 is preferably conical, as shown here, in which case the apparatus for dropletization 5 is within the conical reactor head 3 above the cylindrical region. Alternatively, however, it is also possible to make the reactor cylindrical in the reactor head 3 as well, with a diameter as in the middle region 7. Preference is given, however, to a conical configuration of the reactor head 3. The position of the apparatus for dropletization 5 is selected such that there is still a sufficiently large distance between the outermost holes through which the monomer solution is supplied and the wall of the reactor to prevent the droplets from hitting the wall. For this purpose, the distance should at least be in the range from 50 to 1500 mm, preferably in the range from 100 to 1250 mm and especially in the range from 200 to 750 mm. It will be appreciated that a greater distance from the wall of the reactor is also possible. This has the disadvantage, however, that a greater distance is associated with poorer exploitation of the reactor cross section.

The lower region 9 concludes with a fluidized bed 11, into which the polymer particles formed from the monomer droplets fall during the fall. In the fluidized bed, further reaction proceeds to give the desired product. According to the invention, the outermost holes through which the monomer solution is dropletized are positioned such that a droplet falling vertically downward falls into the fluidized bed 11. This can be achieved, for example, by virtue of the hydraulic diameter of the fluidized bed being at least as large as the hydraulic diameter of the area which is enclosed by a line connecting the outermost holes in the apparatus for dropletization 5, the cross-sectional area of the fluidized bed and the area formed by the line connecting the outermost holes having the same shape and the centers of the two areas being at the same position in a vertical projection of one onto the other. The outermost position of the outer holes relative to the position of the fluidized bed 11 is shown in FIG. 1 with the aid of a dotted line 15.

In order, in addition, to avoid droplets hitting the wall of the reactor in the middle region 7 as well, the hydraulic diameter at the level of the midpoint between the apparatus for dropletization and the gas withdrawal point is at least 10% greater than the hydraulic diameter of the fluidized bed.

The reactor 1 may have any desired cross-sectional shape. However, the cross section of the reactor 1 is preferably circular. In this case, the hydraulic diameter corresponds to the diameter of the reactor 1.

Above the fluidized bed 11, the diameter of the reactor 1 increases in the embodiment shown here, such that the reactor 1 widens conically from the bottom upward in the lower region 9. This has the advantage that polymer particles formed in the reactor 1 that hit the wall can slide downward into the fluidized bed 11 along the wall. To avoid caking, it is additionally possible to provide tappers, not shown here, with which the wall of the reactor is set in vibration, as a result of which adhering polymer particles are detached and slide into the fluidized bed 11.

For gas supply for the operation of the fluidized bed 11, a gas distributor 17 present beneath the fluidized bed 11 blows the gas into the fluidized bed 11.

Since gas is introduced into the reactor 1 both from the top and from the bottom, it is necessary to withdraw gas from the reactor 1 at a suitable position. For this purpose, at least one gas withdrawal point 19 is disposed at the transition from the middle region 7 having constant cross section to the lower region 9 which widens conically from the bottom upward. In this case, the wall of the cylindrical middle region 7 projects into the lower region 9 which widens conically in the upward direction, the diameter of the conical lower region 9 at this position being greater than the diameter of the middle region 7. In this way, an annular chamber 21 which surrounds the wall of the middle region 7 is formed, into which the gas flows and can be drawn off through the at least one gas withdrawal point 19 connected to the annular chamber 21.

The further-reacted polymer particles of the fluidized bed 11 are withdrawn by a product withdrawal point 23 in the region of the fluidized bed.

FIG. 2 shows an arrangement of radial dropletizer channels of different length.

In a first embodiment, the apparatus for dropletization has radial channels 25. In this case, one portion of the channels 25 projects into the middle of the reactor 1. A further portion of the channels 24 projects less far into the reactor 1, and so, especially in the outer regions of the reactor where the distance between the radial channels 25 projecting into the middle of the reactor 1 is high, further channels 24 through which the monomer solution can be introduced into the reactor 1 are provided. This allows more homogeneous distribution of the droplets over the total reactor cross section.

A corresponding star-shaped arrangement of the channels 25 is shown in FIG. 3. Further possible arrangements of the channels are shown in FIGS. 4 and 5. In these, however, an arrangement with an angle β to the horizontal can be achieved only with difficulty, such that the channels 25 in this case preferably run horizontally. FIG. 4 shows an arrangement in rectangular pitch, in which the individual channels 25 are each arranged at an angle of 90° to one another, such that the points of intersection 27 of the channels each form rectangles, preferably squares.

FIG. 5 shows an arrangement in triangular pitch. The channels 25 here are each arranged at an angle of 60° relative to one another, such that the points of intersection 27 of the channels 25 each form equilateral triangles. However, this additionally requires the channels that run parallel in each case always to have an equal separation.

As an alternative to the embodiments shown here, it is of course also possible to arrange the channels such that the distance between channels arranged in parallel varies, or the distance between the channels arranged in parallel is equal in each case but the distances between the channels that are arranged in parallel and run in different directions are different. In addition, it is also possible to arrange the channels at any other angle relative to one another.

Especially in the case of a circular reactor cross section, however, the star-shaped arrangement shown in FIG. 3 is preferred. In this case, however, the number of channels may vary as a function of the circumference of the reactor. In addition, it is possible to configure the channels with different lengths, such that they project into the reactor 1 to different extents. However, a rotationally symmetrical arrangement is always preferred.

The position of dropletizer plates 26 which conclude the channels for supply of the monomer solution at the base thereof, and in which the holes through which the monomer solution is dropletized into the reactor are formed, is shown in FIGS. 3 to 5 by the dotted areas.

According to the invention, the number of channels 24, 25 is selected such that the ratio of the area covered by the channels 24, 25 or the dropletizer head in the reactor relative to the area which is defined by the circumference of a line along the outermost holes is less than 50%. This ensures that sufficient gas can flow past the channels 24, 25 and adequate contact between gas and the droplets leaving the channels 24, 25 is achieved.

FIGS. 6, 7 and 8 show cross sections through channels 25 in different embodiments.

In order to obtain a homogeneous droplet distribution over the reactor cross section, it is preferable when at least the droplets that are formed in a channel in the outer holes exit at an angle to the vertical, i.e. to the reactor axis. For this purpose, it is possible, for example, to configure the region of the channel in which the holes are formed, as shown in FIG. 6, in the form of a circle segment. As a result of this, the angle α at which the monomer solution exits in relation to the reactor axis 29 increases from the middle of the channel outward.

Alternatively, it is also possible, as shown in FIG. 7, to align the channel base in which the holes are formed at an angle to the horizontal, in which case, for holes at right angles to the channel base 31, the angle α at which the droplets exit relative to the reactor axis corresponds to the angle α of the channel base to the horizontal. Another possibility is a configuration in which, in addition to the angled regions of the channel base 31, a middle base region 33 runs horizontally.

In order to enable simple cleaning of the holes, it is advantageous when the holes are formed in dropletizer plates which are positioned at correspondingly configured orifices in the base of the channels 25. The dropletizer plates can then be deinstalled for cleaning and replaced by clean dropletizer plates. In this case, the dropletizer plates are preferably configured either in the form of a circle segment or in angled form, in order that a base profile of the channel 25 as shown in FIGS. 6 to 8 can be achieved.

Especially in the case of a star-shaped arrangement of the channels, it is additionally preferable when the angle at which the monomer solution exits increases from the middle of the reactor outward.

As well as the circular cross section shown here, it is also possible to configure the channels 25 with any other cross section. Especially when dropletizer plates are used, it is particularly preferable to form the channels 25 with a rectangular cross section. In this case, the channel may be sealed at the top by a removable lid, and the dropletizer plates may be removed and exchanged in a simple manner after removal of the lid.

FIG. 9 shows a top view of a dropletizer plate.

A dropletizer plate 26 has a number of holes 35 through which the monomer solution is dropletized into the reactor. The monomer solution flows through the holes 35 and, after leaving the dropletizer plate 26, disintegrates into droplets. The droplets are produced immediately after departure from the dropletizer plate 26.

According to the invention, the number of holes in the dropletizer plate relative to the area of the dropletizer plate 26 is chosen such that the number of holes relative to the area which is defined by the circumference of a line along the outermost holes 35 of the dropletizer plate 26 is within the range from 1000 to 15 000 holes/m$^2$, preferably within the range from 2000 to 12 000 holes/m$^2$ and especially within the range from 4000 to 10 000 holes/m$^2$. All the dropletizer plates of the apparatus for dropletization 5 in the reactor 1 are taken into account here. The appropriate number of holes 35 produces a sufficiently large amount of droplets to be able to operate the reactor economically; on the other hand, the number of droplets must not become so great that individual droplets collide and coalesce. The number of droplets therefore has to be chosen such that every droplet is surrounded by a sufficiently large gas volume with which collision with other droplets can be substantially avoided. Complete avoidance of droplet collisions and coalescence of individual droplets cannot be achieved if the reactor is still to be operated in an economically viable manner. However, substantial avoidance is achieved when the number of holes 35 in the dropletizer plate relative to the area which is defined by the circumference of a line along the outermost holes 35 of the dropletizer plate 26 is within the range described above.

From a manufacturing point of view, it is preferable when the holes 35 for monomer addition are arranged in parallel adjacent rows of holes 37, as shown here. In order to substantially avoid collision of the droplets, a suitable distance between the holes in a row of holes and of the rows of holes from one another is in the range from 1 to 100 mm, preferably in the range from 2 to 50 mm and especially in the range from 3 to 20 mm.

LIST OF REFERENCE NUMERALS

1 reactor
3 reactor head
5 apparatus for dropletization
7 middle region
9 lower region
11 fluidized bed
12 monomer feed
13 addition point for gas
15 position of the outermost holes in relation to the fluidized bed 11
17 gas distributor
19 gas withdrawal point
21 annular chamber
23 product withdrawal point
24 channel
25 channel
26 dropletizer plate
27 point of intersection
29 reactor axis
31 channel base
33 middle region of base
35 hole for monomer addition
37 row of holes

The invention claimed is:

1. An apparatus for introducing droplets of a monomer solution for production of poly(meth)acrylate into a reactor (1) for droplet polymerization, comprising at least one channel (25) or a dropletizer head, the channel (25) or the dropletizer head being sealed at its base by a dropletizer plate (26), the dropletizer plate (26) having holes through which the monomer solution is introduced into the reactor (1), and the dropletizer plate (26) being configured such that holes (35) that, in an axially symmetric dropletizer plate (26) or in an annular dropletizer plate or in one configured as a ring segment, are not on a center line of the dropletizer plate (26) or, in the case of a circular dropletizer plate, are not at the center of the dropletizer plate (26) are aligned such that monomer solution is introduced through the holes (35) into the reactor (1) at an angle to the vertical in the range from 0° to 30°, and the holes (35) in the case of a radial alignment of axially symmetric dropletizer plates (26) being aligned such that the angle at which the monomer solution is introduced into the reactor (1) decreases in the direction of the axis of the reactor (1) and, in the case of dropletizer plates (26) arranged parallel to one another or of concentrically arranged dropletizer plates, each being aligned on a line parallel to the center line or line running concentrically about the center, such that the angle at which the monomer solution is introduced into the reactor (1) is constant and is in a range from 0° to 30°.

2. The apparatus according to claim 1, wherein at least two distributor arrangements each having at least two dropletizer plates (26) arranged in parallel to one another are arranged at an angle relative to one another so as to result in a multiangular pitch.

3. The apparatus according to claim 1, wherein the decreasing angle at which the monomer solution is introduced into the reactor in the case of radial arrangement of the dropletizer plates (26) is obtained by virtue of a channel being sealed by at least two dropletizer plates (26) and the angle at which the monomer solution is dropletized into the reactor (1) being constant for each row of holes in a dropletizer plate (26), the angles being less in the dropletizer plates (26) disposed closer to the middle of the reactor (1) than the angles of the dropletizer plates (26) disposed further to the outside.

4. The apparatus according to claim 1, wherein the angle at which the monomer solution is introduced into the reactor (1) in the case of a radial arrangement of the dropletizer plates (26) increases from the center of the reactor (1) outward in a dropletizer plate (26).

5. The apparatus according to claim 4, wherein the angle α at which the monomer solution exits at least from the holes at the radial edges is within the range defined below:

$$\frac{r}{N_{LR} \cdot d_P \cdot v^{0.578}} \cdot (0.00697 \cdot r + 0.0332) - 6.296 \le$$
$$\alpha \le \frac{r}{N_{LR} \cdot d_P \cdot v^{0.578}} \cdot (0.00697 \cdot r + 0.0332) + 4.704,$$

for the range of validity $$0.25 \text{ m} \le r \le 10 \text{ m}$$
$$0.0001 \text{ m} \le d_P \le 0.0015 \text{ m}$$
$$3\frac{\text{m}}{\text{s}} \le v \le 30\frac{\text{m}}{\text{s}}$$
$$3 \le N_{LR} \le 18.$$

where r is the radial position of the hole in meters, $N_{LR}$ is the number of channels, $d_p$ is the mean droplet diameter in meters and v is the droplet exit velocity in meters per second.

6. The apparatus according to claim 1, wherein holes along the center line running parallel to the axis of the channel (25) in a dropletizer plate (26) configured in an axially symmetric manner or as a ring or ring section, or at the center in a circular dropletizer plate, are aligned such that the monomer solution which is introduced through these holes drips vertically downward.

7. The apparatus according to claim 1, wherein the dropletizer plates (26) have a profile angled along the central line thereof, a profile multiply angled symmetrically to the central line, or a profile in the form of a circle segment.

8. The apparatus according to claim 1, wherein a plurality of channels (25) each having one or more dropletizer plates (26) are included in a radial, parallel or angular arrangement of the dropletizer plates (26).

9. The apparatus according to claim 1, wherein the distance from the outermost holes (35) of a dropletizer plate (26) to the edge of the dropletizer plate (26) is not more than 200 mm.

10. The apparatus according to claim 1, wherein the holes have a diameter in the range from 25 to 500 μm.

11. The apparatus according to claim 1, wherein the holes have a distance from one another in the range from 1 to 100 mm.

12. The apparatus according to claim 3, wherein the angle at which the monomer solution is introduced into the reactor (1) in the case of a radial arrangement of the dropletizer plates (26) increases from the center of the reactor (1) outward in a dropletizer plate (26).

* * * * *